No. 704,534. Patented July 15, 1902.
G. W. GREENWOOD.
BRAKE MECHANISM.
(Application filed Mar. 31, 1902.)
(No Model.) 2 Sheets—Sheet 1.
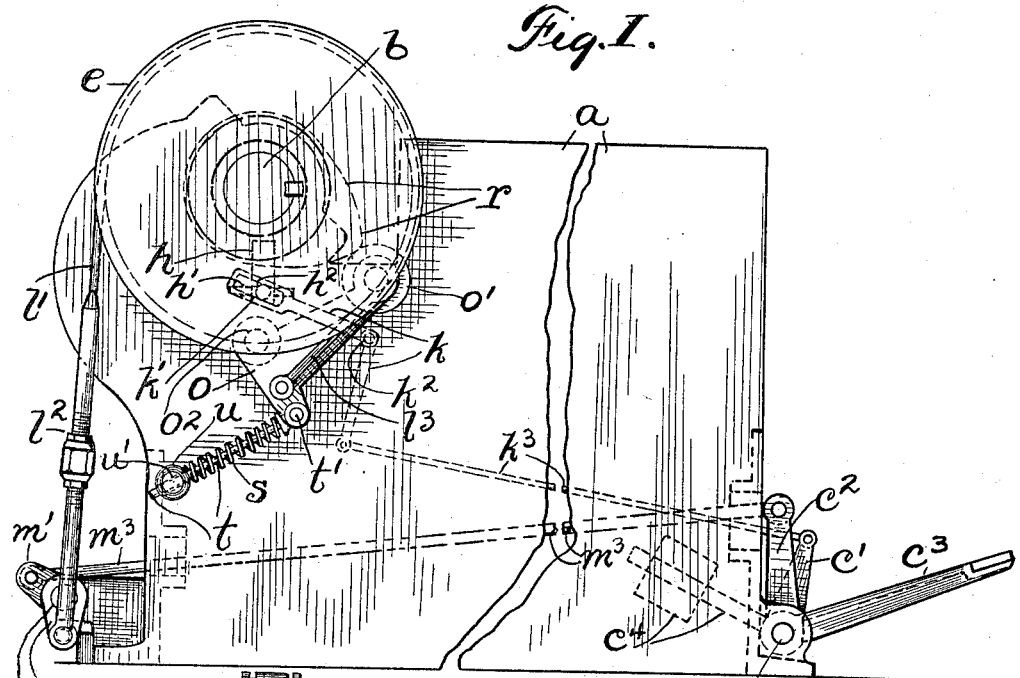
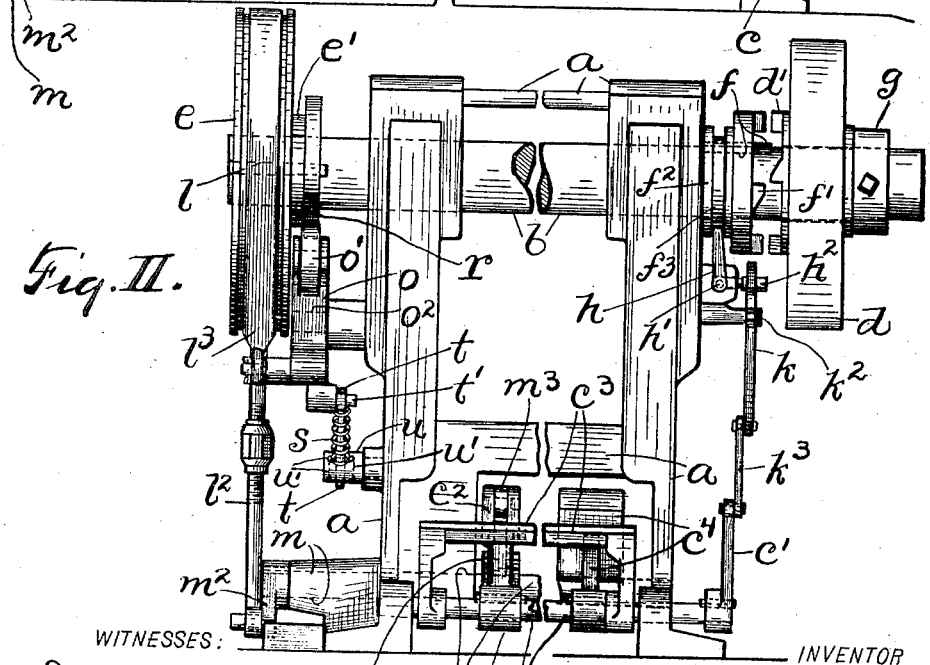
WITNESSES:
Daniel E. Daly.
G. M. Hayes.
INVENTOR
George W. Greenwood
BY
his ATTORNEYS No. 704,534. Patented July 15, 1902.
G. W. GREENWOOD.
BRAKE MECHANISM.
(Application filed Mar. 31, 1902.)
(No Model.) 2 Sheets—Sheet 2.
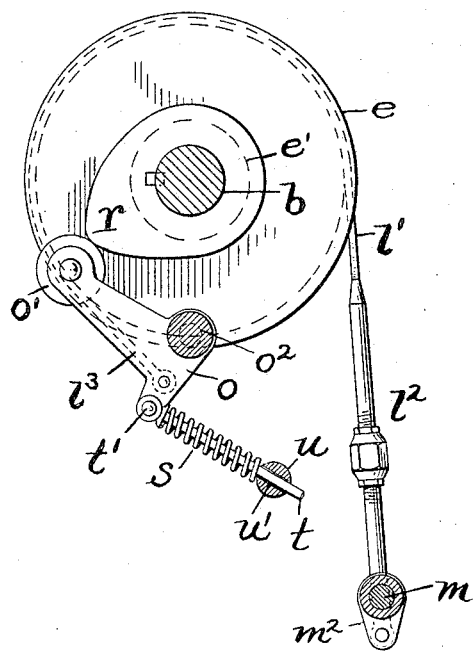
Fig. III.
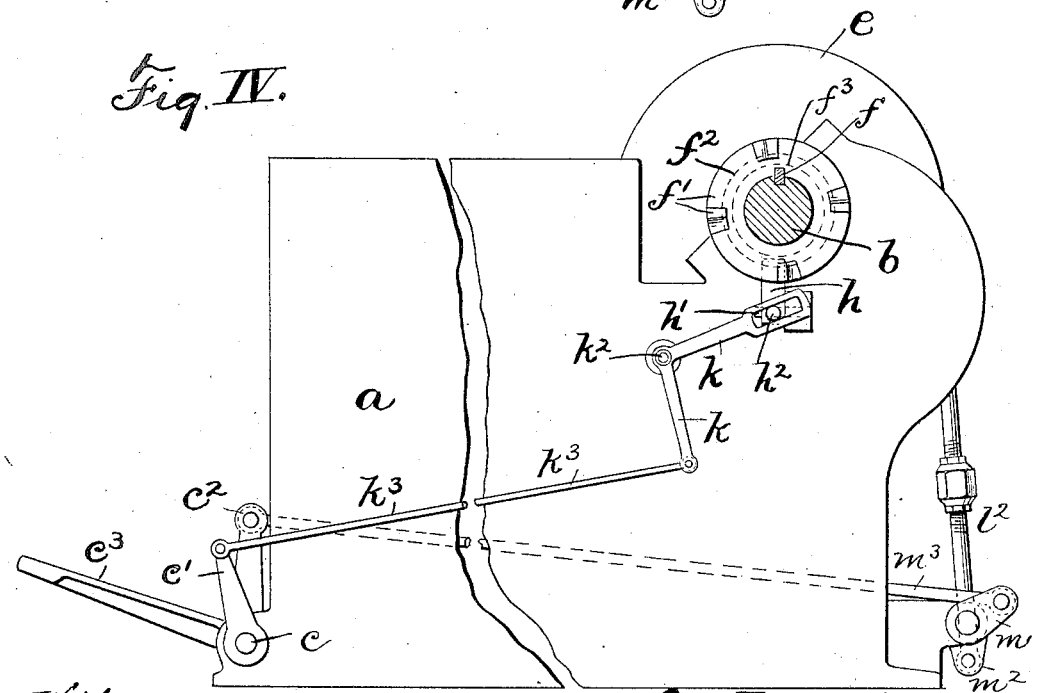
Fig. IV.
Witnesses,
Elsa Schwartz
Daniel E. Daly
Inventor,
George W. Greenwood
By Fynch & Dreier
his Attorneys

UNITED STATES PATENT OFFICE.

GEORGE W. GREENWOOD, OF CLEVELAND, OHIO.

BRAKE MECHANISM.

SPECIFICATION forming part of Letters Patent No. 704,534, dated July 15, 1902.

Application filed March 31, 1902. Serial No. 100,844. (No model.)

*To all whom it may concern:*

Be it known that I, GEORGE W. GREENWOOD, a citizen of the United States of America, residing at Cleveland, in the county of Cuyahoga and State of Ohio, have invented certain new and useful Improvements in Brake Mechanism; and I do hereby declare the following to be a full, clear, and exact description of the invention, such as will enable others skilled in the art to which it pertains to make and use the same.

My invention relates to improvements in brake mechanism, and pertains more especially to a brake mechanism whereby the rotation of a shaft is quickly stopped upon interrupting operative connection between the shaft and the pulley or wheel employed in transmitting power to the shaft.

The object of my invention is to provide a powerful automatically-operated brake mechanism which is simple, effective, and reliable in its operation; and with this object in view my invention consists in certain features of construction and combinations of parts hereinafter described, and pointed out in the claims.

In the accompanying drawings, Figure I is an elevation showing a shaft and my improved brake mechanism. Fig. II is a right-hand side elevation relative to Fig. I. Fig. III is an elevation in vertical section taken through the shaft $b$ in close proximity to the cam $r$ looking in the direction of the brake-band-engaging wheel $e$. Fig. IV is an elevation in vertical section taken through the shaft $b$ between the clutch members $d'$ and $f'$ looking in the direction of the wheel $e$.

Portions are broken away in the drawings to reduce the size of the same.

Referring to the drawings, $a$ designates the stationary framework of a machine, and $b$ a suitably-rotated shaft which is supported from the said framework at the top and near one end of the framework. The shaft $b$ is arranged transversely of the said end of the framework $a$ in a horizontal plane, and an oscillating shaft $c$ is arranged parallel with the shaft $b$ at the bottom and opposite end of the said framework. A suitably-driven pulley or wheel $d$, employed in transmitting power to the shaft $b$, is loosely mounted upon one end of the said shaft, and a brake-band-engaging wheel $e$ is operatively mounted upon the opposite end of the said shaft.

A clutch is employed to make operative connection between the power-transmitting wheel $d$ and the shaft $b$, which clutch comprises two companion members $d'$ and $f'$ in the usual manner. The clutch member $d'$ is formed upon or rigid with the inner end of the hub of the wheel $d$, whereas the clutch member $f'$ is operatively and slidably mounted upon the shaft $b$ opposite to and faces the relatively stationary clutch member $d'$, and operative connection between the wheel $d$ and the shaft $b$ is established or interrupted, according as the shiftable clutch member $f'$ is slid into or out of operative engagement with the companion clutch member $d'$, and a collar $g$ is fixed upon the shaft $b$ at the outer end of the hub of the wheel $d$ and prevents displacement of the said wheel endwise of and outwardly upon the shaft. The clutch member $f'$ is preferably splined upon the shaft $b$, as at $f$, and is provided with an externally and annularly grooved collar $f^2$, whose groove $f^3$ is engaged by one arm of a bell-crank $h$, which is arranged below the shaft $b$ and is fulcrumed, as at $h'$, at right angles to the said shaft to the framework $a$, and the other arm $h^2$ of the bell-crank $h$ engages a slot $k'$, (shown in dotted lines, Fig. I,) which is formed in and extends longitudinally of one arm of another bell-crank $k$, which is also fulcrumed, as at $k^2$, to the framework $a$, but parallel with the shaft $b$, and the other arm of the bell-crank $k$ is operatively connected by a rod $k^3$ with a lever $c'$, operatively mounted upon the adjacent end of the shaft $c$, which is operatively provided also with an upright arm or lever $c^2$, operatively connected with a brake-band $l$, which extends over the wheel $e$ at the band's end portion $l'$ which is farthest from the shaft $c$. The said end portion $l'$ of the brake-band extends downwardly from the wheel $e$ and is operatively connected by a rod $l^2$ with the arm or lever $m^2$ of a shaft $m$, which is arranged parallel with the shaft $c$ and is supported from the framework. The arm $m^2$ is normally vertical and depends from the shaft $m$. The shaft $m$ is operatively provided with another arm or lever $m'$, which is operatively connected by a rod $m^3$ with the arm or lever $c^2$ of the shaft $c$. The other end portion $l^3$ of the brake-band $l$ is attached to one arm of a bell-crank $o$, whose other arm is provided with a roller $o'$, which normally extends somewhat into the sweep of a cam $r$, with which the shaft $b$ is provided. Preferably the cam $r$ is formed upon the hub $e'$ of the brake-band wheel $e$, and is consequently operatively connected with the shaft $b$.

The bell-crank $o$ is fulcrumed, as at $o^2$, to the framework $a$.

A suitably-applied spiral spring $s$ acts to retain the bell-crank $o$ in its normal position and is preferably coiled upon a rod $t$, which is pivoted at one end, as at $t'$, to the bell-crank $o$ and has its other end extending loosely through a slot or hole $u'$, formed in a stud or lug $u$, with which the framework $a$ is provided. The shaft $c'$ is provided also with a treadle or foot-lever $c^3$, which extends longitudinally and outwardly and upwardly from the said shaft.

The arrangement of parts is such that once in every rotation of the shaft $b$ the cam $r$ comes into engagement with the roller $o'$ and actuates the bell-crank $o$ against the action of the spring $s$ and in the direction required to pull upon the end portion $l^3$ of the brake-band $l$. In the normal position of the parts the movable clutch member $f'$ is out of operative engagement with the companion power-transmitting clutch member $d'$. The arrangement of the parts is furthermore such that a depression of the treadle or foot-lever $c^3$ against the action of a poise-bearing arm $c^4$, with which the said shaft $c$ is provided, results in the oscillation of the shaft $c$ in the direction required to operate the lever mechanism, which operatively connects the clutch member $f'$ with the said shaft $c$, as already indicated, as required to move the said clutch member into operative engagement with the companion clutch member $d'$, and thereby effect a rotation of the shaft $b$, and the arrangement of the lever mechanism which operatively connects the shaft $c$ with the end portion $l'$ of the brake-band $l$, as already indicated, is such as to result in the loosening of the said band relative to the wheel $e$ when the shaft $c$ is operated to render the clutch operative to such an extent that the actuation of the roller-bearing lever $o$ by the cam $r$ during the rotation of the shaft $b$ shall not result in rendering the said band operative; but the slack in the said band is taken up when the clutch is rendered inoperative. In other words, the arrangement of the parts is such that the brake-band is caused to powerfully engage the brake-band-engaging wheel during the operation of the cam-actuated lever by the cam or is loosened to such an extent as to render it inoperative during the said actuation of the cam-actuated lever, according as the shaft $c$ is oscillated into the one or the other of its positions, and that the aforesaid clutch is rendered operative or inoperative, according as the brake-band is rendered inoperative or operative.

What I claim is—

1. The combination, with the stationary framework, a shaft, a brake-band-engaging wheel and a cam operatively connected with the said shaft, and a brake-band extending over and circumferentially of the said wheel, of lever mechanism operatively connected with one end portion of the band, a lever operatively connected with the other end portion of the band and arranged to be engaged and actuated by the cam during the rotation of the shaft, and means acting to retain the said lever in its normal position, and the arrangement of the parts and the trend of the cam being such that the brake-band is caused to powerfully engage the aforesaid wheel during the operation of the aforesaid lever by the cam, or is loosened to such an extent as to render it inoperative during the actuation of the cam-actuated lever, according as the aforesaid lever mechanism is actuated into the one or the other of its positions.

2. The combination, with the stationary framework, a shaft, a brake-band-engaging wheel and a cam operatively connected with the shaft, and a brake-band extending over and circumferentially of the said wheel, of lever mechanism operatively connected with one end portion of the band, a roller-bearing lever operatively connected with the other end portion of the band and arranged to be engaged and actuated by the cam during the rotation of the shaft, and a suitably-applied spring acting to retain the said lever in its normal position, and the arrangement of the parts and the trend of the cam being such that the brake-band, in the normal position of the aforesaid lever mechanism, is caused to powerfully engage the aforesaid wheel during the actuation of the aforesaid lever by the cam, and that the said band upon the operation of the said lever mechanism is loosened to such an extent as to render it inoperative during the actuation of the cam-actuated lever.

3. The combination, with the stationary framework, a shaft, a brake-band-engaging wheel and a cam operatively connected with the shaft, and a brake-band extending over and circumferentially of the said wheel, lever mechanism operatively connected with one end portion of the brake-band and operatively connected with the oscillating shaft, a lever operatively connected with the upper end portion of the brake-band, and normally arranged to be engaged and actuated by the said cam during the operation of the first-mentioned shaft, and means acting to retain the cam-actuated lever in its normal position, and the arrangement of the parts being such that the brake-band is caused to powerfully engage the brake-band-engaging wheel during the operation of the cam-actuated lever by the cam, or is loosened to such an extent as to render it inoperative during the said actuation of the cam-actuated lever, according as the aforesaid oscillating shaft is oscillated into the one or the other of its positions.

4. The combination, with the stationary framework; a shaft; a brake-band-engaging wheel and a cam operatively connected with the said shaft, and a brake-band extending over and circumferentially of the said wheel, of an oscillating shaft below the said wheel and having an arm or lever operatively connected with one end portion of the band, which shaft has another and normally depending arm or lever; another oscillating shaft having an arm or lever operatively connected with the aforesaid depending arm or lever of the first-mentioned oscillating shaft; means acting to retain the said oscillating shafts in their normal position; another lever arranged to be engaged by the aforesaid cam during the rotation of the first-mentioned shaft, and means acting to retain the said cam-actuated lever in its normal position, and the arrangement of the parts and the trend of the cam being such that the brake-band is caused to powerfully engage the aforesaid wheel during the operation of the cam-actuated lever by the cam, or is loosened to such an extent as to render it inoperative during the said actuation of the cam-actuated lever, according as the aforesaid oscillating shafts are actuated into the one or the other of their positions.

5. In combination, a stationary framework, a shaft, a brake-band-engaging wheel and a cam operatively connected with the shaft, a brake-band extending over and circumferentially of the said wheel, a power-transmitting wheel loosely mounted on the shaft, a clutch arranged to control operative connection between the last-mentioned wheel and the shaft, an oscillating shaft, lever mechanism adapted to render the clutch operative and operatively connected with the last-mentioned shaft, lever mechanism operatively connected with one end portion of the brake-band and operatively connected with the oscillating shaft, a lever operatively connected with the other end portion of the brake-band and normally arranged to be engaged and actuated by the said cam during the operation of the first-mentioned shaft, and means acting to retain the cam-actuated lever in its normal position, and the arrangement of the parts being such that the brake-band is caused to powerfully engage the brake-band-engaging wheel during the operation of the cam-actuated lever by the cam, or is loosened to such an extent as to render it inoperative during the said actuation of the cam-actuated lever, according as the aforesaid oscillating shaft is oscillated into the one or the other of its positions, and that the aforesaid clutch is rendered operative or inoperative according as the brake-band is rendered inoperative or operative.

In testimony whereof I sign the foregoing specification, in the presence of two witnesses, this 22d day of January, 1902, at Cleveland, Ohio.

GEORGE W. GREENWOOD.

Witnesses:
C. H. DORER,
G. M. HAYES.